United States Patent
Allen et al.

(10) Patent No.: US 11,983,722 B1
(45) Date of Patent: May 14, 2024

(54) SYSTEMS AND METHODS FOR FRAUD LIABILITY SHIFTING

(71) Applicant: American Express Travel Related Services Company, Inc., New York, NY (US)

(72) Inventors: Clinton R. Allen, Chandler, AZ (US); Dewi J. Apun, Red Bank, NJ (US); Christopher J. Fletcher, Hove (GB); Jeffrey Fromm, Phoenix, AZ (US); Ashish Gupta, Phoenix, AZ (US); Alois T. Stock, White Plains, NY (US); Angee Stonehouse, New York, NY (US)

(73) Assignee: AMERICAN EXPRESS TRAVEL RELATED SERVICES COMPANY, INC., New York, NY (US)

( * ) Notice: Subject to any disclaimer, the term of this patent is extended or adjusted under 35 U.S.C. 154(b) by 0 days.

(21) Appl. No.: 17/542,945

(22) Filed: Dec. 6, 2021

Related U.S. Application Data

(63) Continuation of application No. 14/288,096, filed on May 27, 2014, now Pat. No. 11,216,815.

(51) Int. Cl.
G06Q 20/36 (2012.01)
G06Q 20/40 (2012.01)

(52) U.S. Cl.
CPC ......... G06Q 20/4016 (2013.01); G06Q 20/36 (2013.01); G06Q 20/363 (2013.01)

(58) Field of Classification Search
None
See application file for complete search history.

(56) References Cited

U.S. PATENT DOCUMENTS

| | | | |
|---|---|---|---|
| 9,275,211 B2* | 3/2016 | Stubblefield | H04L 63/18 |
| 9,519,763 B1* | 12/2016 | Rodriguez | G06V 40/18 |
| 10,116,677 B2* | 10/2018 | Faulkner | H04L 67/146 |
| 2014/0250011 A1* | 9/2014 | Weber | G06Q 20/4016 705/44 |
| 2015/0019425 A1* | 1/2015 | Kumar | G06Q 20/382 705/44 |
| 2015/0106265 A1* | 4/2015 | Stubblefield | G06Q 20/4016 705/325 |
| 2015/0235207 A1* | 8/2015 | Murphy, Jr. | G06Q 20/4016 705/44 |
| 2015/0254635 A1* | 9/2015 | Bondesen | G06Q 20/36 705/41 |
| 2015/0324795 A1* | 11/2015 | Gerber | G06Q 20/34 705/44 |
| 2016/0063500 A1* | 3/2016 | Sherlock | G06Q 20/3825 705/44 |

* cited by examiner

*Primary Examiner* — Christopher Bridges
*Assistant Examiner* — Tony P Kanaan
(74) *Attorney, Agent, or Firm* — Sterne, Kessler, Goldstein & Fox P.L.L.C.

(57) ABSTRACT

A method comprising creating, by a computer-based system for shifting financial responsibility for a transaction from a merchant to a transaction account issuer, a digital wallet associated with a transaction account holder, wherein the digital wallet comprises one or more attributes associated with the transaction account holder, confirming, by the computer-based system, the attribute in response to a transaction request, and/or determining, by the computer-based system, whether to shift financial responsibility for the transaction from the merchant to the transaction account issuer.

20 Claims, 4 Drawing Sheets

| Device Attributes | Vendor Device ID (Calculated) |
| --- | --- |
| | Mobile Device ID |
| | Secure Element ID |
| | Cookie ID |
| | Browser User Agent |
| | UA Operating System |
| | UA Browser |
| | UA Device |
| | Screen Resolution |
| | User Language |
| | Browser Language |
| | System Language |
| | Device Type |
| | Device Geo-Location |
| | Device Time Zone |

| Card Attributes | CM15/PAN |
| --- | --- |
| | Expiration Date |
| | Name on the Card |
| | Billing Address |
| | Billing Zip Code |
| | Billing address country code |
| | Billing Address change date |
| | Device-Card Trust Level |
| | Device-Card Authentication Method |
| | Days since Authentication Method |

| Wallet Attributes | Wallet ID |
| --- | --- |
| | Wallet Provider |
| | E-mail |
| | Mobile Phone Number |
| | Tenure of Wallet ID (in days) |
| | Number of days since last Log In |
| | Tenure of Pair Wallet ID – CARD (in days) |
| | Number of cards in the Wallet |
| | Number of cards with binding |
| | Number of days since last Password reset/change |
| | Number of days since last Email/UserID recovery |

| Session Attributes | IP Address |
| --- | --- |
| | ISP |
| | Organization |
| | Domain |
| | Net Speed |
| | User Type |

| Transaction Attributes | SE10 |
| --- | --- |
| | MCC Code |
| | Amount |
| | Merchant Country Code |
| | Currency Code |
| | Shipping same as billing Indicator |
| | Ship-to Name |
| | Ship-to Address |
| | Ship-to-Postal Code |
| | Ship-to Phone |
| | Ship-to Country CD |
| | Ship-to-Email |
| | Shipping Address Tenure in days |

FIG. 3

| Purchase Session Attributes (pending alignment) | Wallet Transaction ID |
| --- | --- |
| | Wallet Transaction ID Value / SafeKey Transaction ID value |
| | Dynamic CID Value |
| | Wallet ECI Value |
| | Wallet Transaction Date |
| | Wallet Transaction Time |
| Shipping Attributes | Ship-to Name |
| | Ship-to Address |
| | Ship-to-Postal Code |
| | Ship-to Phone |
| | Ship-to Country CD |
| | Ship-to-Email |
| Card Attributes | CM15/Pan |
| | Name on the Card |
| | Billing Address |
| | Billing Zip Code |
| | Billing address country code |

SYSTEMS AND METHODS FOR FRAUD LIABILITY SHIFTING

CROSS-REFERENCE TO RELATED PATENT APPLICATIONS

This application is a continuation of U.S. application Ser. No. 14/288,096, filed on May 27, 2014, which is incorporated herein by reference in its entirety.

FIELD

The present disclosure generally relates to e-commerce, and more particularly, to an authentication application programming interface ("API") capable of shifting fraud liability away from a merchant based upon a variety of factors.

BACKGROUND

At present, merchants typically bear the risk of fraudulent e-commerce (card not present or online) transactions. Thus, where a fraudulent transaction is conducted online, merchants (as opposed to transaction account issuers) usually bear the expense of the fraudulent transaction.

SUMMARY

In various embodiments, a method for enhanced authorization and/or shifting liability from a merchant to a transaction account issuer is disclosed. The method may comprise creating (by an authorization computer-based system) a digital wallet associated with a transaction account holder. The digital wallet may comprise one or more attributes associated with the transaction account holder, and/or confirming the attribute in response to a transaction request. The method may further determine whether to shift financial responsibility for the transaction from the merchant to the transaction account issuer. Moreover, in various embodiments, a request may be received from a merchant system to approve the transaction request. A digital wallet may, in various embodiments, comprise a first attribute entered by the transaction account holder as well as a second attribute gathered by the computer-based system. The transaction account issuer may issue, based on the attribute, a challenge question to the transaction account holder. Should the transaction account holder satisfy the challenge, the transaction account issuer may accept financial liability for the transaction, should the transaction be fraudulent. However, the transaction account issuer may also decline to shift responsibility for the transaction from the merchant to the transaction account issuer based upon an incorrect response to the challenge question. The method may further comprise automatically populating a merchant online form.

BRIEF DESCRIPTION OF THE DRAWINGS

The features and advantages of the present disclosure will become more apparent from the detailed description set forth below when taken in conjunction with the drawings. The left-most digit of a reference number identifies the drawing in which the reference number first appears.

FIG. 3 illustrates, in accordance with various embodiments, a variety of data which may be associated with a transaction account holder; and FIG. 4 illustrates, in accordance with various embodiments, a variety of data which may be associated with a transaction account holder and transferred to a merchant during an online transaction.

DETAILED DESCRIPTION

Figure 1:
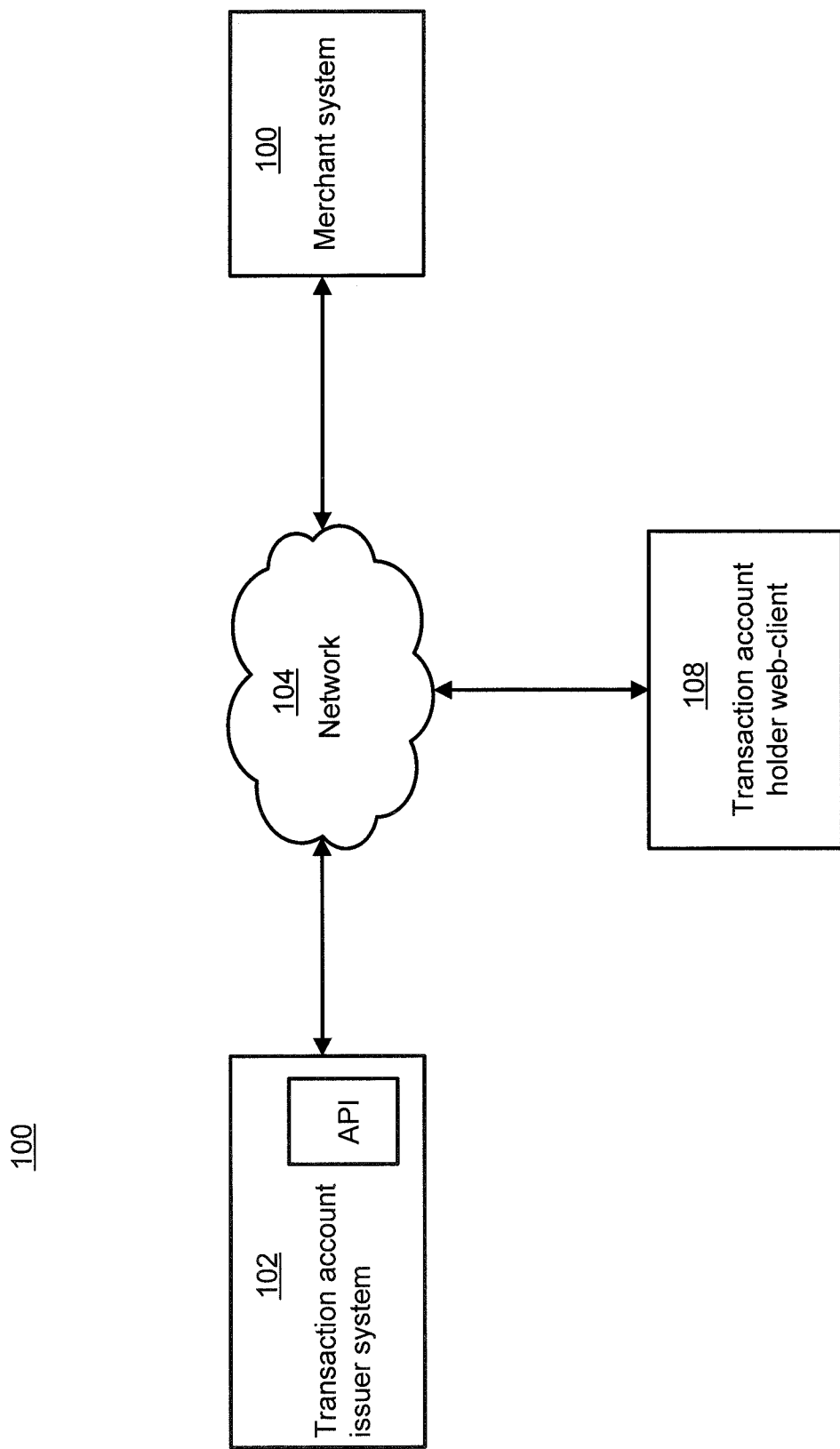
FIG. 1 illustrates, in accordance with various embodiments, a system for transferring liability for fraud associated with an online transaction from a merchant to a transaction account issuer.

The detailed description of exemplary embodiments herein makes reference to the accompanying drawings, which show the exemplary embodiments by way of illustration and their best mode. While these exemplary embodiments are described in sufficient detail to enable those skilled in the art to practice the disclosure, it should be understood that other embodiments may be realized and that logical and mechanical changes may be made without departing from the spirit and scope of the disclosure. Thus, the detailed description herein is presented for purposes of illustration only and not of limitation. For example, the steps recited in any of the method or process descriptions may be executed in any order and are not limited to the order presented. Moreover, any of the functions or steps may be outsourced to or performed by one or more third parties. Furthermore, any reference to singular includes plural embodiments, and any reference to more than one component may include a singular embodiment.

Phrases and terms similar to "financial institution," "transaction account issuer" and "payment processor" may include any person, entity, software and/or hardware that offers transaction account services. Although often referred to as a "financial institution," the financial institution may represent any type of bank, lender or other type of account issuing institution, such as credit card companies, card sponsoring companies, or third party issuers under contract with financial institutions. It is further noted that other participants may be involved in some phases of the transaction, such as an intermediary settlement institution.

Phrases and terms similar to a "transaction account holder," "buyer," "participant", "consumer," and/or "user" may include any person, entity, software and/or hardware that receives items in exchange for consideration (e.g. financial payment). For example, a buyer may purchase, lease, rent, barter or otherwise obtain items from a supplier and pay the supplier using a transaction account.

Phrases and terms similar to an "item" may include any good, service, information, experience, data, discount, rebate, points, virtual currency, content, access, rental, lease, contribution, account, credit, debit, benefit, right, reward, points, coupons, credits, monetary equivalent, anything of value, something of minimal or no value, monetary value, non-monetary value and/or the like. Moreover, the "transactions" or "purchases" discussed herein may be associated with an item. Furthermore, a "reward" may be an item.

Phrases or terms similar to a "processor" (such as a payment processor) or "transaction account issuer" may include a company (e.g., a third party) appointed (e.g., by a merchant) to handle transactions for merchant banks. Processors may be broken down into two types: front-end and back-end. Front-end processors have connections to various transaction accounts and supply authorization and settlement services to the merchant banks' merchants. Back-end processors accept settlements from front-end processors and, via The Federal Reserve Bank, move money from an issuing bank to the merchant bank. In an operation that will usually take a few seconds, the payment processor will both check the details received by forwarding the details to the respective account's issuing bank or card association for verification, and may carry out a series of anti-fraud measures against the transaction. Additional parameters, including the account's country of issue and its previous payment history, may be used to gauge the probability of the transaction being approved. In response to the payment processor receiving confirmation that the transaction account details have been verified, the information may be relayed back to the merchant, who will then complete the payment transaction. In response to the verification being denied, the payment processor relays the information to the merchant, who may then decline the transaction.

As used herein, "transmit" may include sending electronic data from one system component to another over a network connection. Additionally, as used herein, "data" may include encompassing information such as commands, queries, files, data for storage, and the like in digital or any other form.

The terms "payment vehicle," "financial transaction instrument," "transaction instrument," or "transaction account product" may be used interchangeably throughout to refer to a financial instrument. As used herein, an account code may be associated with a transaction account, but may or may not be associated with a physical financial instrument.

Phrases or terms similar to "transaction account" may include any account that may be used to facilitate a financial transaction. A "transaction account" as used herein refers to an account associated with an open account or a closed account system (as described herein). The transaction account may exist in a physical or non-physical embodiment. For example, a transaction account may be distributed in non-physical embodiments such as an account number, frequent-flyer account, and telephone calling account or the like. Furthermore, a physical embodiment of a transaction account may be distributed as a financial instrument.

In general, transaction accounts may be used for transactions between the user and merchant through any suitable communication means, such as, for example, a telephone network, intranet, the global, public Internet, a point of interaction device (e.g., a point of sale (POS) device, personal digital assistant (PDA), mobile telephone, kiosk, etc.), online communications, off-line communications, wireless communications, and/or the like.

As used herein, an application programming interface ("API") may comprise any software capable of performing an interaction between one or more software components as well as interacting with and/or accessing one or more data storage elements (e.g., server systems, databases, hard drives, and the like). An API may comprise a library that specifies routines, data structures, object classes, variables, and the like. Thus, an API may be formulated in a variety of ways and based upon a variety of specifications or standards, including, for example, POSIX, the MICROSOFT WINDOWS API, a standard library such as C++, a JAVA API, and the like.

Further, as used herein, an "attribute" may comprise any quality, feature, and/or characteristic of a transaction account holder, such as the transaction account holder's native language, the transaction account holder's city and state of residence, and the like. Further, an attribute may comprise data. In various embodiments, data may comprise any information, facts, and/or statistic collected about a transaction account holder. Thus, for example, data may comprise a transaction account holder's transaction account data, a number of days since a transaction account holder's last login to a particular account, a transaction account number, an expiration date, an IP address of the web-client 102, and the like (e.g., as shown in FIGS. 3 and 4).

Referring to FIG. 1, a system 100 configured for transferring the responsibility for payment of a fraudulent transaction from a merchant to a transaction account issuer is shown. The system 100 may comprise, in various embodiments, a transaction account issuer system 102, a network 104, a merchant system 106, and/or a transaction account holder web-client 108. The transaction account issuer system 102 may include one or more APIs, as described herein.

A network 104 may comprise any electronic communications system or method which incorporates software and/or hardware components. Communication may be accomplished through any suitable communication channels, such as, for example, a telephone network, an extranet, an intranet, Internet, point of interaction device (point of sale device, personal digital assistant, smart phone, cellular phone (e.g., iPhone®, Palm Pilot®, Blackberry®), kiosk, etc.), online communications, satellite communications, off-line communications, wireless communications, transponder communications, local area network (LAN), wide area network (WAN), virtual private network (VPN), networked or linked devices, keyboard, mouse and/or any suitable communication or data input modality. Moreover, although a network 104 may be described herein as being implemented with TCP/IP communications protocols, the network 104 may also be implemented using IPX, Appletalk, IP-6, NetBIOS, OSI, any tunneling protocol (e.g. IPsec, SSH), or any number of existing or future protocols. If the network 104 is in the nature of a public network, such as the Internet, it may be advantageous to presume the network 104 to be insecure and open to eavesdroppers. Specific information related to the protocols, standards, and application software utilized in connection with the Internet is generally known to those skilled in the art and, as such, need not be detailed herein. See, for example, DILIP NAIK, INTERNET STANDARDS AND PROTOCOLS (1998); JAVA 2 COMPLETE, various authors, (Sybex 1999); DEBORAH RAY AND ERIC RAY, MASTERING HTML 4.0 (1997); and LOSHIN, TCP/IP CLEARLY EXPLAINED (1997) and DAVID GOURLEY AND BRIAN TOTTY, HTTP, THE DEFINITIVE GUIDE (2002), the contents of which are hereby incorporated by reference.

A merchant system 106 may comprise any hardware and/or software suitable and/or capable of accommodating an online or e-commerce transaction. Thus, a merchant system 106 may comprise any website architecture such as a multi-tier client-server architecture (e.g., a three-tier architecture). A merchant system 106 may therefore generate and/or provide a merchant e-commerce website where a customer may shop for items offered for sale by the merchant online.

A transaction account holder web-client 108 may include any device (e.g., personal computing device/mobile communication device) which communicates via any network. A web-client may be associated with and/or used by a consumer, a merchant, or both. A web-client may comprise a variety of browsing software or browser applications (e.g., Microsoft Internet Explorer, Mozilla Firefox, Google Chrome, Apple Safari, or any other of the myriad software packages available for browsing the internet). Such browser applications may comprise Internet browsing software installed within a computing unit or a system to conduct online transactions and/or communications. These computing units or systems may take the form of a computer or processor, or a set of computers/processors, although other types of computing units or systems may be used, including laptops, notebooks, hand held computers, personal digital assistants, cellular phones, smart phones (e.g., iPhone®, BlackBerry®, Droid®, etc.) set-top boxes, workstations, computer-servers, main frame computers, mini-computers, PC servers, pervasive computers, network sets of computers, personal computers, such as iPads, iMACs, and MacBooks, kiosks, terminals, point of sale (POS) devices and/or terminals, televisions, or any other device capable of receiving data over a network 104.

As those skilled in the art will appreciate, a web-client may include an operating system (e.g., Windows NT, 95/98/2000/CE/Mobile, OS2, UNIX, Linux, Solaris, MacOS, PalmOS, etc.) as well as various conventional support software and drivers typically associated with computers. A web-client may implement security protocols such as Secure Sockets Layer (SSL) and Transport Layer Security (TLS). A web-client may implement one or more application layer protocols, including, for example, http, https, ftp, and sftp. Transactions originating at a web client may pass through a firewall (not shown; see below) in order to prevent unauthorized access from users of other networks.

Figure 2:
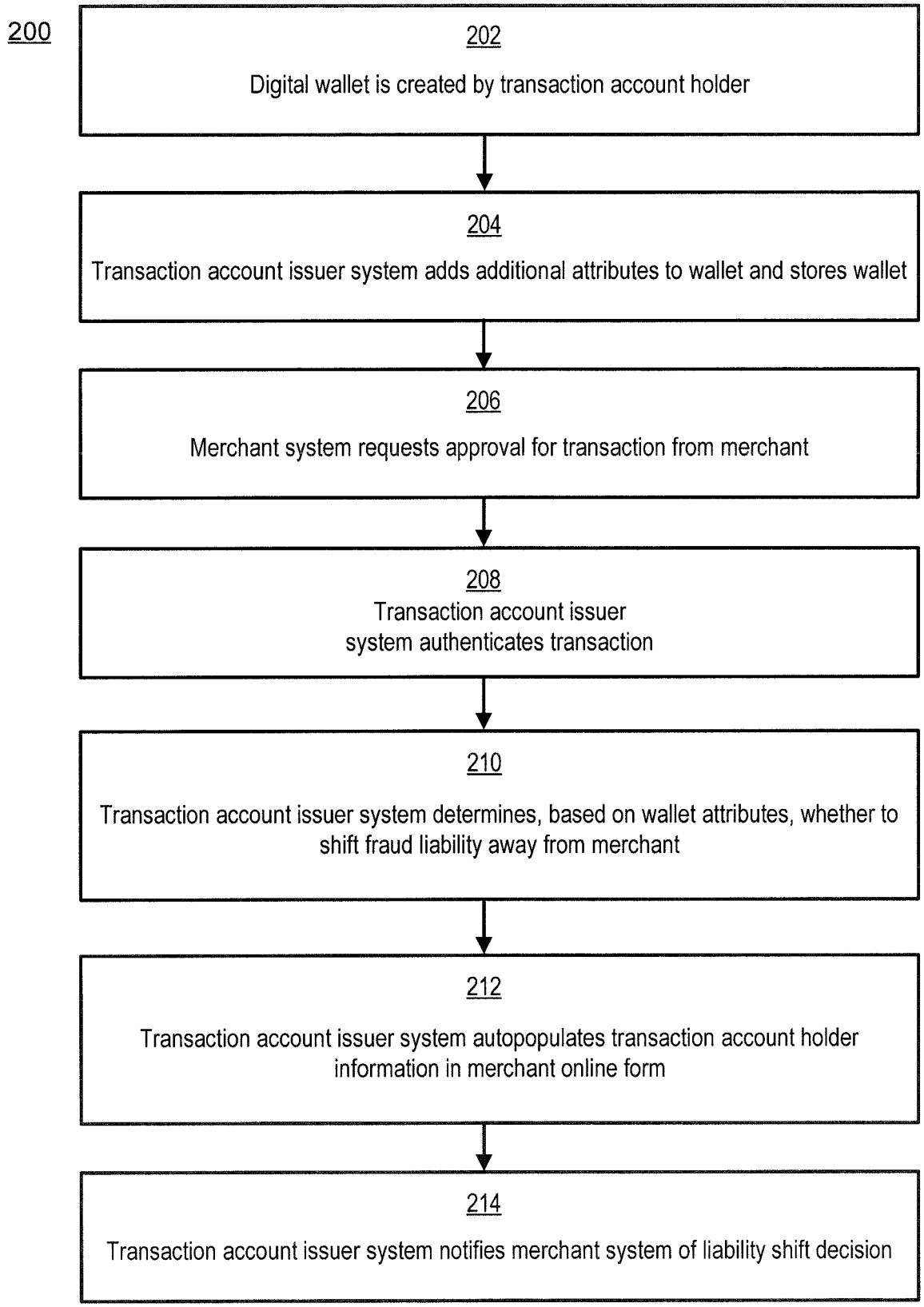
FIG. 2 illustrates, in accordance with various embodiments, a process for transferring liability for fraud associated with an online transaction from a merchant to a transaction account issuer.

With reference to FIG. 2, an example process 200 for additional fraud checking, enhanced authorization and transferring fraud liability extending from an online transaction from a merchant to a transaction account issuer is shown. Additional features for enhanced authorization may be found in, for example, U.S. application Ser. No. 13/411,299 entitled "SYSTEMS AND METHODS FOR ENHANCED AUTHORIZATION FRAUD MITIGATION" and filed Mar. 2, 2012 which issued as U.S. Pat. No. 8,719,167 on May 6, 2014; U.S. application Ser. No. 13/411,370 entitled "SYSTEMS AND METHODS FOR ENHANCED AUTHORIZATION FRAUD MITIGATION" and filed Mar. 2, 2012 which issued as U.S. Pat. No. 8,650,120 on Feb. 11, 2014 U.S. and application Ser. No. 14/213,925 filed Mar. 14, 2014, all of which are incorporated herein by reference in their entirety.

In various embodiments, a transaction account holder may sign into a transaction account issuer system 102 provided website to create a "digital wallet" (step 202). A digital wallet may be established previously and does not need to be established for each transaction. However, the information associated with the digital wallet may be supplemented, deleted or changed at various times. The digital wallet may reside anywhere or in multiple places and/or may be partially or fully controlled by any entity or person. The digital wallet may also receive information from various entities or people.

As used herein, a "digital wallet" may comprise a collection of information, such as a variety of attributes. The attributes may be associated with a transaction account holder, such as any of the attributes shown at FIGS. 3 and 4. For example, a transaction account holder (or others) may provide (for storage by the transaction account issuer system 102) one or more transaction accounts, as well as a variety of attributes associated with each transaction account. The digital wallet may also obtain attributes from a third party (e.g., credit agency, etc). In addition, the transaction account issuer system 102 (or other systems) may collect a variety of attributes associated with the transaction account holder and/or the transaction account holder's web-client 102. These attributes may be added to the transaction account holder's digital wallet (step 204).

The transaction account holder may, in various embodiments, engage in an online shopping experience by reviewing the items offered for sale by a merchant (or others) on the merchant's online website. The transaction account holder may select one or more items for purchase from the merchant's website. In response, the merchant website may display for the transaction account holder a purchase portion of the website (e.g., a "checkout" page), where the transaction account holder is requested by the merchant website to enter a variety of attributes, such as the transaction account holder's transaction account number, the expiration date of the transaction account, the transaction account holder's billing and shipping addresses, and the like. In various embodiments, the merchant may simply process the transaction based upon these attributes, such as, for example, wherein the transaction account is associated with a transaction account issuer that stores the digital wallet. However, in various embodiments, a transaction account issuer that stores the digital wallet may be capable of performing a variety of fraud shifting operations.

Traditionally, a transaction account holder might be required to enter the one or more attributes each time the transaction account holder performed a transaction online. However, in various embodiments, the transaction account holder may log-in, via the merchant provided website, to the transaction account holder's digital wallet, which may be used to automatically populate the merchant requested attribute fields, thereby saving the transaction account holder time and effort expended entering these attributes for each online transaction.

In addition, the merchant system may, in response, request an authorization for the requested transaction from the transaction account issuer system 102 (step 206). The additional authorizations discussed herein may occur before, during and/or after the typical authorization process.

Traditionally, the merchant system 106 may simply request an authorization for the e-commerce transaction, and the transaction account issuer system 102 makes a determination as to whether to authorize the transaction based upon very limited attributes (as the merchant system 106 typically transferred little, if any, attributes, such as the transaction account number, billing address, and expiry date of the account to the transaction account issuer system 102). Thus, as the transaction account issuer system 102 has had little information, aside from the transaction account number, the transaction account issuer system 102 has made the decision as to whether to approve the transaction relatively "in the blind." Accordingly, in the past, merchants performing e-commerce transactions have borne the liability for fraudulent e-commerce transactions, because transaction account issuers have been unable to verify that the individual engaging in the transaction is the individual who owns the transaction account—that is, whether the requested transaction is fraudulent.

In various embodiments, one or more APIs integrated with, communicating with or installed with the transaction account issuer system 102 may authenticate (based on at least some of the attributes shown in FIGS. 3 and/or 4) the transaction account holder to a selected transaction account (step 208). For example, as part of the transaction account holder's digital wallet, the transaction account issuer system 102 may determine whether to approve the transaction account holder's request to approve payment, based on the APIs comprising routines. More particularly, the digital wallet previously obtained a variety of attributes (e.g., screen resolution and/or user language), so the API may analyze those attributes to determine whether a requested transaction is likely fraudulent. The API may communicate with the web-client to determine the web-client attributes, and compares the web-client attributes to the attributes stored in the digital wallet. The API may also analyze transaction attributes, and compare the transaction attributes to attributes stored in the digital wallet. For example, a transaction account holder whose typical language is English, for example, may be flagged as conducting a suspicious transaction, where the online transaction is being conducted in Chinese. The issuer then associates a flag with the transaction to indicate that the transaction may be suspicious.

Thus, the transaction account issuer system 102 may determine (e.g., prior to transmitting an authorization for a requested payment to a merchant system 106), based upon a variety of attributes (e.g., as shown in FIGS. 3 and 4), whether to approve a transaction.

If the transaction account issuer system 102 determines to approve the transaction, the transaction account issuer may accept financial liability for the transaction if it is not fraudulent, because the transaction account issuer system 102 has a large number of factors to determine whether the transaction is fraudulent (step 210). The system may flag the transaction as a transaction with issuer liability.

However, if the transaction account issuer system 102 determines that the requested transaction, based upon digital wallet attributes, is for some reason suspicious (e.g., the IP address of the transaction account holder web-client 108 has changed), the transaction account issuer system 102 may, through the API, flag the transaction request as suspicious.

In response to a transaction being flagged as suspicious, the transaction account issuer system 102 may issue a challenge to the transaction account holder through the transaction account holder's web-client 108. For example, the transaction account issuer system 102 may transmit a verification code to the transaction account holder's mobile communication device. The transaction account issuer system 102 and/or the merchant may cause the merchant website to include an entry field for such verification code. The entry field may be part of the merchant webpages and/or in a pop-up window. The transaction account holder may be required to enter the verification code (or challenge answer) in the merchant website (or into a verification pop-up window provided by the merchant website), before the transaction request is approved by the transaction account issuer system 102. Such verification code (or challenge answer) is then transmitted back to the issuer (or otherwise obtained by the issuer).

If the transaction account holder answers the challenge correctly, the transaction account issuer system 102 may accept financial responsibility for the transaction. The issuer may then flag the transaction as issuer liability.

If the transaction account issuer system 102 still determines that the requested transaction is likely fraudulent (e.g., a number of factors in FIGS. 3 and 4 are incorrect, partially incorrect, and/or missing), the transaction account issuer system 102 may decline or refuse the transaction request and notify the merchant that it will not process the transaction. In response to a rejection, the transaction account holder may select a different transaction account from his digital wallet, if one exists, to complete the transaction.

Thus, the transaction account issuer system 102 may utilize a variety of attributes (e.g., the attributes shown in FIGS. 3 and 4) to authorize or decline a transaction. Where the transaction account issuer system authorizes a transaction, the transaction account issuer may shift liability for the transaction away from the merchant and to itself.

In various embodiments, the methods described herein are implemented using the various particular machines described herein. The methods described herein may be implemented using the particular machines, and those hereinafter developed, in any suitable combination, as would be appreciated immediately by one skilled in the art. Further, as is unambiguous from this disclosure, the methods described herein may result in various transformations of certain articles.

For the sake of brevity, conventional data networking, application development and other functional aspects of the systems (and components of the individual operating components of the systems) may not be described in detail herein. Furthermore, the connecting lines shown in the various figures contained herein are intended to represent exemplary functional relationships and/or physical couplings between the various elements. It should be noted that many alternative or additional functional relationships or physical connections may be present in a practical system.

An "account", "account code", or "account number", as used herein, may include any device, code, number, letter, symbol, digital certificate, smart chip, digital signal, analog signal, biometric or other identifier/indicia suitably configured to allow the consumer to access, interact with or communicate with the system (e.g., one or more of an authorization/access code, personal identification number (PIN), Internet code, other identification code, and/or the like). The account number may optionally be located on or associated with a rewards card, charge card, credit card, debit card, prepaid card, telephone card, embossed card, smart card, magnetic stripe card, bar code card, transponder, radio frequency card or an associated account. The system may include or interface with any of the foregoing cards or devices, QR codes, Bluetooth, Near Field Communication, or a transponder and RFID reader in RF communication with the transponder (which may include a fob). Typical devices may include, for example, a key ring, tag, card, cell phone, wristwatch or any such form capable of being presented for interrogation.

Moreover, the system, computing unit or device discussed herein may include a "pervasive computing device," which may include a traditionally non-computerized device that is embedded with a computing unit. Examples can include watches, Internet enabled kitchen appliances, restaurant tables embedded with RF readers, wallets or purses with imbedded transponders, etc.

The account code may be distributed and stored in any form of plastic, electronic, magnetic, radio frequency, wireless, audio and/or optical device capable of transmitting or downloading data from itself to a second device. A customer account code may be, for example, a sixteen-digit transaction account code, although each transaction account provider has its own numbering system, such as the fifteen-digit numbering system used by American Express. Each company's transaction account codes comply with that company's standardized format such that the company using a fifteen-digit format will generally use three-spaced sets of numbers, as represented by the number "0000 000000 00000". The first five to seven digits are reserved for processing purposes and identify the issuing bank, card type, etc. In this example, the last (fifteenth) digit is used as a sum check for the fifteen digit number. The intermediary eight-to-eleven digits are used to uniquely identify the customer. A merchant account code may be, for example, any number or alpha-numeric characters that identify a particular merchant for purposes of card acceptance, account reconciliation, reporting, or the like.

It should be noted that the transfer of information in accordance with the present disclosure, may be completed in a format recognizable by a merchant system or account issuer. In that regard, by way of example, the information may be transmitted from a contactless (e.g., an RFID device) to a contactless (e.g., RFID) reader or from the contactless reader to the merchant system in a variety of formats, e.g., magnetic stripe or multi-track magnetic stripe format.

The various system components discussed herein may include one or more of the following: a host server or other computing systems including a processor for processing digital data; a memory coupled to the processor for storing digital data; an input digitizer coupled to the processor for inputting digital data; an application program stored in the memory and accessible by the processor for directing processing of digital data by the processor; a display device coupled to the processor and memory for displaying information derived from digital data processed by the processor; and a plurality of databases. Various databases used herein may include: client data; merchant data; financial institution data; and/or like data useful in the operation of the system. As those skilled in the art will appreciate, user computer may include an operating system (e.g., Windows NT, 95/98/2000, XP, Vista, OS2, UNIX, Linux, Solaris, MacOS, etc.) as well as various conventional support software and drivers typically associated with computers. A user may include any individual, business, entity, government organization, software and/or hardware that interact with a system.

In an embodiment, various components, modules, and/or engines of the system may be implemented as micro-applications or micro-apps. Micro-apps are typically deployed in the context of a mobile operating system, including for example, a Palm mobile operating system, a Windows mobile operating system, an Android Operating System, Apple iOS, a Blackberry operating system and the like. The micro-app may be configured to leverage the resources of the larger operating system and associated hardware via a set of predetermined rules which govern the operations of various operating systems and hardware resources. For example, where a micro-app desires to communicate with a device or network other than the mobile device or mobile operating system, the micro-app may leverage the communication protocol of the operating system and associated device hardware under the predetermined rules of the mobile operating system. Moreover, where the micro-app desires an input from a user, the micro-app may be configured to request a response from the operating system which monitors various hardware components and then communicates a detected input from the hardware to the micro-app.

The system contemplates uses in association with web services, utility computing, pervasive and individualized computing, security and identity solutions, autonomic computing, cloud computing, commodity computing, mobility and wireless solutions, open source, biometrics, grid computing and/or mesh computing.

The various system components described herein may be independently, separately or collectively coupled to the network 104 via one or more data links including, for example, a connection to an Internet Service Provider (ISP) over a local loop as is typically used in connection with standard modem communication, cable modem, Dish networks, ISDN, Digital Subscriber Line (DSL), or various wireless communication methods, see, e.g., GILBERT HELD, UNDERSTANDING DATA COMMUNICATIONS (1996), which is hereby incorporated by reference. It is noted that the network 104 may be implemented variously. For example, network 104 may be implemented as an interactive television (ITV) network. The systems and methods disclosed herein contemplate the use, sale and/or distribution of any goods, services or information over any network having functionality similar to that described above with reference to network 104.

"Cloud" or "Cloud computing" includes a model for enabling convenient, on-demand network access to a shared pool of configurable computing resources (e.g., networks, servers, storage, applications, and services) that can be rapidly provisioned and released with minimal management effort or service provider interaction. Cloud computing may include location-independent computing, whereby shared servers provide resources, software, and data to computers and other devices on demand. For more information regarding cloud computing, see the NIST's (National Institute of Standards and Technology) definition of cloud computing at http://csrc.nist.gov/publications/nistpubs/800-145/SP800-145.pdf (last visited June 2012), which is hereby incorporated by reference in its entirety.

Any databases discussed herein may include relational, hierarchical, graphical, or object-oriented structure and/or any other database configurations. Common database products that may be used to implement the databases include DB2 by IBM (Armonk, NY), various database products available from Oracle Corporation (Redwood Shores, CA), Microsoft Access or Microsoft SQL Server by Microsoft Corporation (Redmond, Washington), MySQL by MySQL AB (Uppsala, Sweden), or any other suitable database product. Moreover, the databases may be organized in any suitable manner, for example, as data tables or lookup tables. Each record may be a single file, a series of files, a linked series of data fields or any other data structure. Association of certain data may be accomplished through any desired data association technique such as those known or practiced in the art. For example, the association may be accomplished either manually or automatically. Automatic association techniques may include, for example, a database search, a database merge, GREP, AGREP, SQL, using a key field in the tables to speed searches, sequential searches through all the tables and files, sorting records in the file according to a known order to simplify lookup, and/or the like. The association step may be accomplished by a database merge function, for example, using a "key field" in pre-selected databases or data sectors. Various database tuning steps are contemplated to optimize database performance. For example, frequently used files such as indexes may be placed on separate file systems to reduce In/Out ("I/O") bottlenecks.

More particularly, a "key field" partitions the database according to the high-level class of objects defined by the key field. For example, certain types of data may be designated as a key field in a plurality of related data tables and the data tables may then be linked on the basis of the type of data in the key field. The data corresponding to the key field in each of the linked data tables is preferably the same or of the same type. However, data tables having similar, though not identical, data in the key fields may also be linked by using AGREP, for example. In accordance with one embodiment, any suitable data storage technique may be utilized to store data without a standard format. Data sets may be stored using any suitable technique, including, for example, storing individual files using an ISO/IEC 7816-4 file structure; implementing a domain whereby a dedicated file is selected that exposes one or more elementary files containing one or more data sets; using data sets stored in individual files using a hierarchical filing system; data sets stored as records in a single file (including compression, SQL accessible, hashed via one or more keys, numeric, alphabetical by first tuple, etc.); Binary Large Object (BLOB); stored as ungrouped data elements encoded using ISO/IEC 7816-6 data elements; stored as ungrouped data elements encoded using ISO/IEC Abstract Syntax Notation (ASN.1) as in ISO/IEC 8824 and 8825; and/or other proprietary techniques that may include fractal compression methods, image compression methods, etc.

In various embodiments, the ability to store a wide variety of information in different formats is facilitated by storing the information as a BLOB. Thus, any binary information can be stored in a storage space associated with a data set. As discussed above, the binary information may be stored on the financial transaction instrument or external to but affiliated with the financial transaction instrument. The BLOB method may store data sets as ungrouped data elements formatted as a block of binary via a fixed memory offset using either fixed storage allocation, circular queue techniques, or best practices with respect to memory management (e.g., paged memory, least recently used, etc.). By using BLOB methods, the ability to store various data sets that have different formats facilitates the storage of data associated with the financial transaction instrument by multiple and unrelated owners of the data sets. For example, a first data set which may be stored may be provided by a first party, a second data set which may be stored may be provided by an unrelated second party, and yet a third data set which may be stored, may be provided by an third party unrelated to the first and second party. Each of these three exemplary data sets may contain different information that is stored using different data storage fon cats and/or techniques. Further, each data set may contain subsets of data that also may be distinct from other subsets.

As stated above, in various embodiments, the data can be stored without regard to a common format. However, in one exemplary embodiment, the data set (e.g., BLOB) may be annotated in a standard manner when provided for manipulating the data onto the financial transaction instrument. The annotation may comprise a short header, trailer, or other appropriate indicator related to each data set that is configured to convey information useful in managing the various data sets. For example, the annotation may be called a "condition header", "header", "trailer", or "status", herein, and may comprise an indication of the status of the data set or may include an identifier correlated to a specific issuer or owner of the data. In one example, the first three bytes of each data set BLOB may be configured or configurable to indicate the status of that particular data set; e.g., LOADED, INITIALIZED, READY, BLOCKED, REMOVABLE, or DELETED. Subsequent bytes of data may be used to indicate for example, the identity of the issuer, user, transaction/membership account identifier or the like. Each of these condition annotations are further discussed herein.

The data set annotation may also be used for other types of status information as well as various other purposes. For example, the data set annotation may include security information establishing access levels. The access levels may, for example, be configured to permit only certain individuals, levels of employees, companies, or other entities to access data sets, or to permit access to specific data sets based on the transaction, merchant, issuer, user or the like. Furthermore, the security information may restrict/permit only certain actions such as accessing, modifying, and/or deleting data sets. In one example, the data set annotation indicates that only the data set owner or the user are permitted to delete a data set, various identified users may be permitted to access the data set for reading, and others are altogether excluded from accessing the data set. However, other access restriction parameters may also be used allowing various entities to access a data set with various permission levels as appropriate.

The data, including the header or trailer may be received by a stand alone interaction device configured to add, delete, modify, or augment the data in accordance with the header or trailer. As such, in one embodiment, the header or trailer is not stored on the transaction device along with the associated issuer-owned data but instead the appropriate action may be taken by providing to the transaction instrument user at the stand alone device, the appropriate option for the action to be taken. The system may contemplate a data storage arrangement wherein the header or trailer, or header or trailer history, of the data is stored on the transaction instrument in relation to the appropriate data.

One skilled in the art will also appreciate that, for security reasons, any databases, systems, devices, servers or other components of the system may consist of any combination thereof at a single location or at multiple locations, wherein each database or system includes any of various suitable security features, such as firewalls, access codes, encryption, decryption, compression, decompression, and/or the like.

A firewall may comprise any hardware and/or software suitably configured to protect system components and/or enterprise computing resources from users of other networks. Further, a firewall may be configured to limit or restrict access to various systems and components behind the firewall for web clients connecting through a web server. A firewall may reside in varying configurations including Stateful Inspection, Proxy based, access control lists, and Packet Filtering among others. A firewall may be integrated within a web server or any other CMS components or may further reside as a separate entity. A firewall may implement network address translation ("NAT") and/or network address port translation ("NAPT"). A firewall may accommodate various tunneling protocols to facilitate secure communications, such as those used in virtual private networking. A firewall may implement a demilitarized zone ("DMZ") to facilitate communications with a public network such as the Internet. A firewall may be integrated as software within an Internet server, any other application server components or may reside within another computing device or may take the form of a standalone hardware component.

Encryption may be performed by way of any of the techniques now available in the art or which may become available—e.g., Twofish, RSA, El Gamal, Schorr signature, DSA, PGP, PKI, and symmetric and asymmetric cryptosystems.

The computers discussed herein may provide a suitable website or other Internet-based graphical user interface which is accessible by users. In one embodiment, the Microsoft Internet Information Server (IIS), Microsoft Transaction Server (MTS), and Microsoft SQL Server, are used in conjunction with the Microsoft operating system, Microsoft NT web server software, a Microsoft SQL Server database system, and a Microsoft Commerce Server. Additionally, components such as Access or Microsoft SQL Server, Oracle, Sybase, Informix MySQL, Interbase, etc., may be used to provide an Active Data Object (ADO) compliant database management system. In one embodiment, the Apache web server is used in conjunction with a Linux operating system, a MySQL database, and the Perl, PHP, and/or Python programming languages.

Any of the communications, inputs, storage, databases or displays discussed herein may be facilitated through a website having web pages. The term "web page" as it is used herein is not meant to limit the type of documents and applications that might be used to interact with the user. For example, a typical website might include, in addition to standard HTML documents, various forms, Java applets, JavaScript, active server pages (ASP), common gateway interface scripts (CGI), extensible markup language (XML), dynamic HTML, cascading style sheets (CSS), AJAX (Asynchronous Javascript And XML), helper applications, plug-ins, and the like. A server may include a web service that receives a request from a web server, the request including a URL (http://yahoo.com/stockquotes/ge) and an IP address (123.56.789.234). The web server retrieves the appropriate web pages and sends the data or applications for the web pages to the IP address. Web services are applications that are capable of interacting with other applications over a communications means, such as the internet. Web services are typically based on standards or protocols such as XML, SOAP, AJAX, WSDL and UDDI. Web services methods are well known in the art, and are covered in many standard texts. See, e.g., ALEX NGHIEM, IT WEB SERVICES: A ROADMAP FOR THE ENTERPRISE (2003), hereby incorporated by reference.

Middleware may include any hardware and/or software suitably configured to facilitate communications and/or process transactions between disparate computing systems. Middleware components are commercially available and known in the art. Middleware may be implemented through commercially available hardware and/or software, through custom hardware and/or software components, or through a combination thereof. Middleware may reside in a variety of configurations and may exist as a standalone system or may be a software component residing on the Internet server. Middleware may be configured to process transactions between the various components of an application server and any number of internal or external systems for any of the purposes disclosed herein. WebSphere MQTM (formerly MQSeries) by IBM, Inc. (Armonk, NY) is an example of a commercially available middleware product. An Enterprise Service Bus ("ESB") application is another example of middleware.

Practitioners will also appreciate that there are a number of methods for displaying data within a browser-based document. Data may be represented as standard text or within a fixed list, scrollable list, drop-down list, editable text field, fixed text field, pop-up window, and the like. Likewise, there are a number of methods available for modifying data in a web page such as, for example, free text entry using a keyboard, selection of menu items, check boxes, option boxes, and the like.

The system and method may be described herein in terms of functional block components, screen shots, optional selections and various processing steps. It should be appreciated that such functional blocks may be realized by any number of hardware and/or software components configured to perform the specified functions. For example, the system may employ various integrated circuit components, e.g., memory elements, processing elements, logic elements, look-up tables, and the like, which may carry out a variety of functions under the control of one or more microprocessors or other control devices. Similarly, the software elements of the system may be implemented with any programming or scripting language such as C, C++, C #, Java, JavaScript, VBScript, Macromedia Cold Fusion, COBOL, Microsoft Active Server Pages, assembly, PERL, PHP, awk, Python, Visual Basic, SQL Stored Procedures, PL/SQL, any UNIX shell script, and extensible markup language (XML) with the various algorithms being implemented with any combination of data structures, objects, processes, routines or other programming elements. Further, it should be noted that the system may employ any number of conventional techniques for data transmission, signaling, data processing, network control, and the like. Still further, the system could be used to detect or prevent security issues with a client-side scripting language, such as JavaScript, VBScript or the like. For a basic introduction of cryptography and network security, see any of the following references: (1) "Applied Cryptography: Protocols, Algorithms, And Source Code In C," by Bruce Schneier, published by John Wiley & Sons (second edition, 1995); (2) "Java Cryptography" by Jonathan Knudson, published by O'Reilly & Associates (1998); (3) "Cryptography & Network Security: Principles & Practice" by William Stallings, published by Prentice Hall; all of which are hereby incorporated by reference.

As used herein, the term "end user", "consumer", "customer", "cardmember", "business" or "merchant" may be used interchangeably with each other, and each shall mean any person, entity, machine, hardware, software or business. A bank may be part of the system, but the bank may represent other types of card issuing institutions, such as credit card companies, card sponsoring companies, or third party issuers under contract with financial institutions. It is further noted that other participants may be involved in some phases of the transaction, such as an intermediary settlement institution, but these participants are not shown.

Each participant is equipped with a computing device in order to interact with the system and facilitate online commerce transactions. The customer has a computing unit in the form of a personal computer, although other types of computing units may be used including laptops, notebooks, hand held computers, set-top boxes, cellular telephones, touch-tone telephones and the like. The merchant has a computing unit implemented in the form of a computer-server, although other implementations are contemplated by the system. The bank has a computing center shown as a main frame computer. However, the bank computing center may be implemented in other forms, such as a mini-computer, a PC server, a network of computers located in the same of different geographic locations, or the like. Moreover, the system contemplates the use, sale or distribution of any goods, services or information over any network having similar functionality described herein.

The merchant computer and the bank computer may be interconnected via a second network, referred to as a payment network. The payment network which may be part of certain transactions represents existing proprietary networks that presently accommodate transactions for credit cards, debit cards, and other types of financial/banking cards. The payment network is a closed network that is assumed to be secure from eavesdroppers. Exemplary transaction networks may include the American Express®, VisaNet® and the Veriphone® networks.

The electronic commerce system may be implemented at the customer and issuing bank. In an exemplary implementation, the electronic commerce system is implemented as computer software modules loaded onto the customer computer and the banking computing center. The merchant computer does not require any additional software to participate in the online commerce transactions supported by the online commerce system.

As will be appreciated by one of ordinary skill in the art, the system may be embodied as a customization of an existing system, an add-on product, upgraded software, a stand alone system, a distributed system, a method, a data processing system, a device for data processing, and/or a computer program product. Accordingly, the system may take the form of an entirely software embodiment, an entirely hardware embodiment, or an embodiment combining aspects of both software and hardware. Furthermore, the system may take the form of a computer program product on a computer-readable storage medium having computer-readable program code means embodied in the storage medium. Any suitable computer-readable storage medium may be utilized, including hard disks, CD-ROM, optical storage devices, magnetic storage devices, and/or the like.

The system and method is described herein with reference to screen shots, block diagrams and flowchart illustrations of methods, apparatus (e.g., systems), and computer program products according to various embodiments. It will be understood that each functional block of the block diagrams and the flowchart illustrations, and combinations of functional blocks in the block diagrams and flowchart illustrations, respectively, can be implemented by computer program instructions.

These computer program instructions may be loaded onto a general purpose computer, special purpose computer, or other programmable data processing apparatus to produce a machine, such that the instructions that execute on the computer or other programmable data processing apparatus create means for implementing the functions specified in the flowchart block or blocks. These computer program instructions may also be stored in a computer-readable memory that can direct a computer or other programmable data processing apparatus to function in a particular manner, such that the instructions stored in the computer-readable memory produce an article of manufacture including instruction means which implement the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions which execute on the computer or other programmable apparatus provide steps for implementing the functions specified in the flowchart block or blocks.

Accordingly, functional blocks of the block diagrams and flowchart illustrations support combinations of means for performing the specified functions, combinations of steps for performing the specified functions, and program instruction means for performing the specified functions. It will also be understood that each functional block of the block diagrams and flowchart illustrations, and combinations of functional blocks in the block diagrams and flowchart illustrations, can be implemented by either special purpose hardware-based computer systems which perform the specified functions or steps, or suitable combinations of special purpose hardware and computer instructions. Further, illustrations of the process flows and the descriptions thereof may make reference to user windows, webpages, websites, web forms, prompts, etc. Practitioners will appreciate that the illustrated steps described herein may comprise in any number of configurations including the use of windows, webpages, web forms, popup windows, prompts and the like. It should be further appreciated that the multiple steps as illustrated and described may be combined into single webpages and/or windows but have been expanded for the sake of simplicity. In other cases, steps illustrated and described as single process steps may be separated into multiple webpages and/or windows but have been combined for simplicity.

In the detailed description herein, references to "one embodiment", "an embodiment", "an example embodiment", "various embodiments", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described. After reading the description, it will be apparent to one skilled in the relevant art(s) how to implement the disclosure in certain embodiments.

Benefits, other advantages, and solutions to problems have been described herein with regard to specific embodiments. However, the benefits, advantages, solutions to problems, and any elements that may cause any benefit, advantage, or solution to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to 'at least one of A, B, and C' or 'at least one of A, B, or C' is used in the claims or specification, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Although the inventions have been described as a method in certain embodiments, it is contemplated that it may be embodied as computer program instructions on a tangible computer-readable carrier, such as a magnetic or optical memory or a magnetic or optical disk. All structural, chemical, and functional equivalents to the elements of the above-described exemplary embodiments that are known to those of ordinary skill in the art are expressly incorporated herein by reference and are intended to be encompassed by the present claims. Moreover, it is not necessary for a device or method to address each and every problem sought to be solved by the present disclosure, for it to be encompassed by the present claims. Furthermore, no element, component, or method step in the present disclosure is intended to be dedicated to the public regardless of whether the element, component, or method step is explicitly recited in the claims. No claim element herein is to be construed under the provisions of 35 U.S.C. 112(f) unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A computer implemented method, comprising:
   generating, at an account issuer system, a digital wallet corresponding to an account holder, wherein the digital wallet includes attribute information corresponding to a web-client used by the account holder;
   receiving, at the account issuer system from a merchant system, a request to authorize an online transaction, wherein the request includes information corresponding to the account holder;
   identifying, at the account issuer system, the digital wallet based on the attribute information corresponding to the account holder;
   acquiring, by the account issuer system and using an application programming interface (API), a web-client attribute corresponding to a web-client requesting the online transaction, wherein the web-client attribute is a session attribute or a device attribute;
   determining, by the account issuer system, that the web-client attribute does not match the attribute information included in the digital wallet;
   in response to determining that the web-client attribute does not match the attribute information included in the digital wallet:
      transmitting, by the account issuer system, a challenge prompt to the merchant system for display to the account holder on the web-client;
      receiving, by the account issuer system and from the merchant system, challenge answer data responsive to the challenge prompt;
      verifying, by the account issuer system, that the challenge answer data satisfies the challenge prompt;
      in response to the verifying, transmitting, by the account issuer system, a notification from the account issuer system to the merchant system indicating a shift of financial liability for the online transaction from the merchant system to the account issuer system; and
      flagging, by the account issuer system, the online transaction as a transaction where the account issuer system has accepted financial liability.

2. The computer implemented method of claim 1, further comprising:
   receiving, at the account issuer system from the merchant system, a second request to authorize a second online transaction, wherein the second request includes information corresponding to the account holder;
   acquiring, by the account issuer system and using the API, a second web-client attribute corresponding to a second web-client requesting the second online transaction, wherein the second web-client attribute is a session attribute or a device attribute;
   determining, by the account issuer system, that the second web-client attribute does not match the attribute information included in the digital wallet; and
   identifying, by the account issuer system, the second request as suspicious.

3. The computer implemented method of claim 2, further comprising:
   in response to identifying the second request as suspicious, transmitting a verification code to a mobile communication device corresponding to the account holder;
   causing a merchant website corresponding to the second online transaction to generate a pop-up window;
   receiving, via the pop-up window, the verification code; and
   in response to receiving the verification code, transmitting a notification from the account issuer system to the merchant system indicating a shift of financial liability for the online transaction from the merchant system to the account issuer system.

4. The computer implemented method of claim 1, further comprising:
   receiving, at the account issuer system from the merchant system, a second request to authorize a second online transaction, wherein the second request includes information corresponding to the account holder;
   acquiring, by the account issuer system and using the API, a plurality of web-client attributes corresponding to a second web-client requesting the second online transaction;
   determining, by the account issuer system, that a threshold number of the plurality of web-client attributes differ from the attribute information included in the digital wallet; and
   transmitting a notification from the account issuer system to the merchant system indicating that the second online transaction is rejected.

5. The computer implemented method of claim 1, wherein the web-client attribute is an IP address of the web-client.

6. The computer implemented method of claim 1, wherein the web-client attribute is a user language.

7. The computer implemented method of claim 1, wherein the web-client attribute is a screen resolution.

8. An account issuer system, comprising:
   a memory; and
   at least one processor coupled to the memory and configured to:
      generate a digital wallet corresponding to an account holder, wherein the digital wallet includes attribute information corresponding to a web-client used by the account holder;
      store the digital wallet in the memory;
      receive, from a merchant system, a request to authorize an online transaction, wherein the request includes information corresponding to the account holder;
      identify the digital wallet based on the information corresponding to the account holder;
      acquire, using an application programming interface (API), a web-client attribute corresponding to a web-client requesting the online transaction, wherein the web-client attribute is a session attribute or a device attribute;
      determine that the web-client attribute does not match the attribute information included in the digital wallet;
      in response to determining that the web-client attribute does not match the attribute information included in the digital wallet:
         transmit, by the account issuer system, a challenge prompt to the merchant system for display to the account holder on the web-client;
         receive, by the account issuer system and from the merchant system, challenge answer data responsive to the challenge prompt;
         verify, by the account issuer system, that the challenge answer data satisfies the challenge prompt;
         in response to the verifying, transmitting, by the account issuer system, a notification from the account issuer system to the merchant system indicating a shift of financial liability for the online transaction from the merchant system to the account issuer system; and flag, by the account issuer system, the online transaction as a transaction where the account issuer system has accepted financial liability.

9. The system of claim 8, wherein the at least one processor is further configured to:
receive, from the merchant system, a second request to authorize a second online transaction, wherein the second request includes information corresponding to the account holder;
acquire, using the API, a second web-client attribute corresponding to a second web-client requesting the second online transaction, wherein the second web-client attribute is a session attribute or a device attribute;
determine that the second web-client attribute does not match the attribute information included in the digital wallet; and
identify the second request as suspicious.

10. The system of claim 9, wherein the at least one processor is further configured to:
in response to identifying the second request as suspicious, transmit a verification code to a mobile communication device corresponding to the account holder;
cause a merchant website corresponding to the second online transaction to generate a pop-up window;
receive, via the pop-up window, the verification code; and
in response to receiving the verification code, transmit a notification to the merchant system indicating a shift of financial liability for the online transaction from the merchant system to the account issuer system.

11. The system of claim 8, wherein the at least one processor is further configured to:
receive, from the merchant system, a second request to authorize a second online transaction, wherein the second request includes information corresponding to the account holder;
acquire, using the API, a plurality of web-client attributes corresponding to a second web-client requesting the second online transaction;
determine that a threshold number of the plurality of web-client attributes differ from the attribute information included in the digital wallet; and
transmit a notification to the merchant system indicating that the second online transaction is rejected.

12. The system of claim 8, wherein the web-client attribute is an IP address of the web-client.

13. The system of claim 8, wherein the web-client attribute is a user language.

14. The system of claim 8, wherein the web-client attribute is a screen resolution.

15. A non-transitory computer-readable device having instructions stored thereon that, when executed by at least one computing device, cause the at least one computing device to perform operations comprising:
generating, at an account issuer system, a digital wallet corresponding to an account holder, wherein the digital wallet includes attribute information corresponding to a web-client used by the account holder;
receiving, at the account issuer system from a merchant system, a request to authorize an online transaction, wherein the request includes information corresponding to the account holder;
identifying, at the account issuer system, the digital wallet based on the information corresponding to the account holder;
acquiring, by the account issuer system and using an application programming interface (API), a web-client attribute corresponding to a web-client requesting the online transaction, wherein the web-client attribute is a session attribute or a device attribute;
determining that the web-client attribute does not matches the attribute information included in the digital wallet;
in response to determining that the web-client attribute does not match the attribute information included in the digital wallet:
transmitting, by the account issuer system, a challenge prompt to the merchant system for display to the account holder on the web-client;
receiving, by the account issuer system and from the merchant system, challenge answer data responsive to the challenge prompt;
verifying, by the account issuer system, that the challenge answer data satisfies the challenge prompt;
in response to the verifying, transmitting, by the account issuer system, a notification from the account issuer system to the merchant system indicating a shift of financial liability for the online transaction from the merchant system to the account issuer system; and
flagging, by the account issuer system, the online transaction as a transaction where the account issuer system has accepted financial liability.

16. The non-transitory computer-readable device of claim 15, the operations further comprising:
receiving, at the account issuer system from the merchant system, a second request to authorize a second online transaction, wherein the second request includes information corresponding to the account holder;
acquiring, by the account issuer system and using the API, a second web-client attribute corresponding to a second web-client requesting the second online transaction, wherein the second web-client attribute is a session attribute or a device attribute;
determining, by the account issuer system, that the second web-client attribute does not match the attribute information included in the digital wallet; and
identifying, by the account issuer system, the second request as suspicious.

17. The non-transitory computer-readable device of claim 16, the operations further comprising:
in response to identifying the second request as suspicious, transmitting a verification code to a mobile communication device corresponding to the account holder;
causing a merchant website corresponding to the second online transaction to generate a pop-up window;
receiving, via the pop-up window, the verification code; and
in response to receiving the verification code, transmitting a notification from the account issuer system to the merchant system indicating a shift of financial liability for the online transaction from the merchant system to the account issuer system.

18. The non-transitory computer-readable device of claim 15, the operations further comprising:
receiving, at the account issuer system from the merchant system, a second request to authorize a second online transaction, wherein the second request includes information corresponding to the account holder;
acquiring, by the account issuer system and using the API, a plurality of web-client attributes corresponding to a second web-client requesting the second online transaction;

determining, by the account issuer system, that a threshold number of the plurality of web-client attributes differ from the attribute information included in the digital wallet; and transmitting a notification from the account issuer system to the merchant system indicating that the second online transaction is rejected.

19. The non-transitory computer-readable device of claim 15, wherein the web-client attribute is an IP address of the web-client.

20. The non-transitory computer-readable device of claim 15, wherein the web-client attribute is a user language or a screen resolution.

\* \* \* \* \*